(12) United States Patent
Dershowitz et al.

(10) Patent No.: US 6,534,027 B2
(45) Date of Patent: Mar. 18, 2003

(54) PROCESS FOR PRODUCING AMMONIA WITH ULTRA-LOW METALS CONTENT

(75) Inventors: Daniel J. Dershowitz, Franklin, OH (US); Ryan L. Mears, Mesquite, TX (US); Jay F. Schnaith, Powell, OH (US); Curtis Dove, Colorado Springs, CO (US); Sadhana Mahapatra, Gahanna, OH (US); Kevin K. Wadsworth, Columbus, OH (US)

(73) Assignee: Ashland, Inc., Covington, KY (US)

( * ) Notice: Subject to any disclaimer, the term of this patent is extended or adjusted under 35 U.S.C. 154(b) by 182 days.

(21) Appl. No.: 09/749,201

(22) Filed: Dec. 27, 2000

(65) Prior Publication Data

US 2002/0081259 A1 Jun. 27, 2002

(51) Int. Cl.⁷ .............................. C01C 1/00; B01D 17/04
(52) U.S. Cl. ........................................ 423/352; 210/708
(58) Field of Search ................................ 210/702, 708; 423/352

(56) References Cited

U.S. PATENT DOCUMENTS

| | | | | |
|---|---|---|---|---|
| 3,295,927 A | * | 1/1967 | Earley | 423/352 |
| 3,679,549 A | * | 7/1972 | Newman et al. | 423/352 |
| 4,075,306 A | * | 2/1978 | Muromura | 423/352 |
| 4,752,452 A | * | 6/1988 | Harbolt et al. | 423/352 |
| 5,496,778 A | | 3/1996 | Hoffman et al. | |
| 5,746,993 A | * | 5/1998 | Mullee | 423/352 |
| 5,846,386 A | | 12/1998 | Hoffman et al. | |
| 6,001,223 A | | 12/1999 | Hoffman | |

FOREIGN PATENT DOCUMENTS

| | | |
|---|---|---|
| EP | 0 976 850 A2 | 2/2000 |
| JP | 8-119626 A | 5/1996 |

\* cited by examiner

*Primary Examiner*—Wayne A. Langel
(74) *Attorney, Agent, or Firm*—Wood, Herron & Evans, LLP

(57) ABSTRACT

Commercial grade ammonia is purified for use in production of semiconductors by initially passing the liquid ammonia through a liquid phase oil separation system. This removes the vast majority of the impurities. The filtered liquid ammonia is then passed through a vaporizer which quiescently forms ammonia vapor and prevents entrainment of impurities within the ammonia vapor. The vapor passes through a vapor filtration system and subsequently to a bubble column. The bubble column is designed so that the bubbles are small enough and travel at a rate which ensures that any entrapped particle within the bubble will have time to migrate to the surface of the bubble and thereby pass through the liquid phase. The collected vapor is directed through subsequent vapor filters and is collected. If anhydrous ammonia is desired, the ammonia vapor is collected upstream of the bubble column.

21 Claims, 2 Drawing Sheets

PROCESS FOR PRODUCING AMMONIA WITH ULTRA-LOW METALS CONTENT

BACKGROUND OF THE INVENTION

Ultra-high purity ammonium hydroxide is commonly used in the manufacture of semiconductor products such as microprocessors. In particular this is used as a cleaning solution in the formation of integrated circuits. As these circuits become smaller and smaller, impurities become less tolerable. In particular, the ammonium hydroxide utilized must be free of any conducting contaminants and in particular metallic contaminants. There is also an integrated circuits market for high purity specialty gas ammonia.

Generally commercially produced ammonia is totally unsuitable for such applications. The production of ammonia such as for use in fertilizers introduces contaminants including oil and metal particles. This commercial grade or fertilizer grade ammonia may include up to 10 ppm free oil and several ppm cadmium, calcium, sodium, iron, zinc and potassium. To be useful for integrated circuit production the metal concentration should be less than about 100 ppt.

There are a number of processes which are designed to purify this commercial grade ammonia. However for various reasons, they are not optimally designed. Hoffman et al., U.S. Pat. Nos. 5,496,778 and 5,846,386 disclose drawing ammonia vapor from a liquid ammonia reservoir and passing the vapor through a filter capable of filtering out particles. Due to the amount of impurities in the ammonia, removing these impurities in the vapor phase is inefficient and to a large extent ineffective. The small size of many of the metal particles makes vapor filtration ineffective. Further the evaporator design permits entrainment of the impurities.

Japanese Patent 8-119626-A discloses passing ammonia gas through a saturated aqueous solution of ammonia. This allows entrainment in the mist and requires a subsequent mist separator. Further due to the design of the device, particles are not given sufficient time to be removed in the liquid bath. There are filtration processes designed to remove oil from ammonia. But these are not capable of to producing ultra high purity ammonia.

SUMMARY OF THE INVENTION

The present invention is premised on the realization that ultra-pure ammonia can be obtained from commercial grade ammonia by first filtering/coalescing liquid ammonia with a liquid phase filter/coalescer to remove almost all of the oil and metal particles which are carried by the oil. The partially cleaned ammonia liquid is then directed to a quiescent evaporator which promotes vapor formation without creating turbulence or bubbles which would promote entrainment of impurities. After vapor phase filtration, the ammonia vapor can be further directed to an aqueous scrubber. The aqueous scrubber is particularly designed to provide small bubbles which follow a path through a saturated water bath. The path provides sufficient time for any particles within the bubbles to contact the bubble wall and migrate into the aqueous liquid. Further, this is done with minimum turbulence to prevent again entrainment of impurities. The ammonia vapor collected from the scrubber can be combined with ultra-high purity water to form an ultra-high purity solution of ammonium hydroxide suitable for use in the semiconductor industry. If ammonia gas on anhydrous ammonia is the desired product, purified ammonia gas for this purpose can be collected after vapor phase filtration.

This process can be practiced in a large free standing plant or can be scaled down to provide on-site production of ammonium hydroxide or ammonia gas.

The objects and advantages of the present invention will be further appreciated in light of the following detailed description and drawings in which:

DETAILED DESCRIPTION

Figure 1:
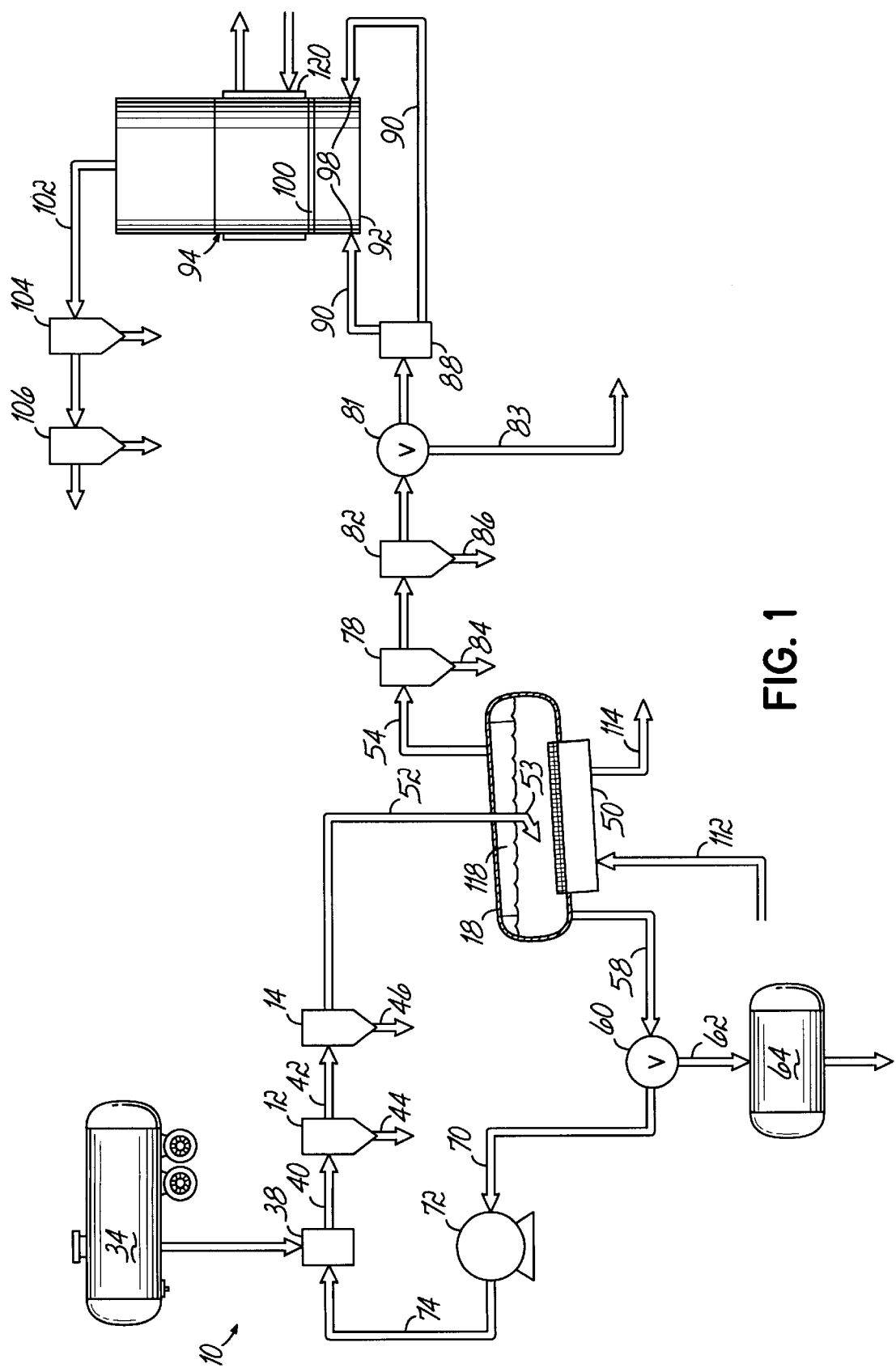
FIG. 1 is a diagrammatic depiction of the present invention.
Figure 2:
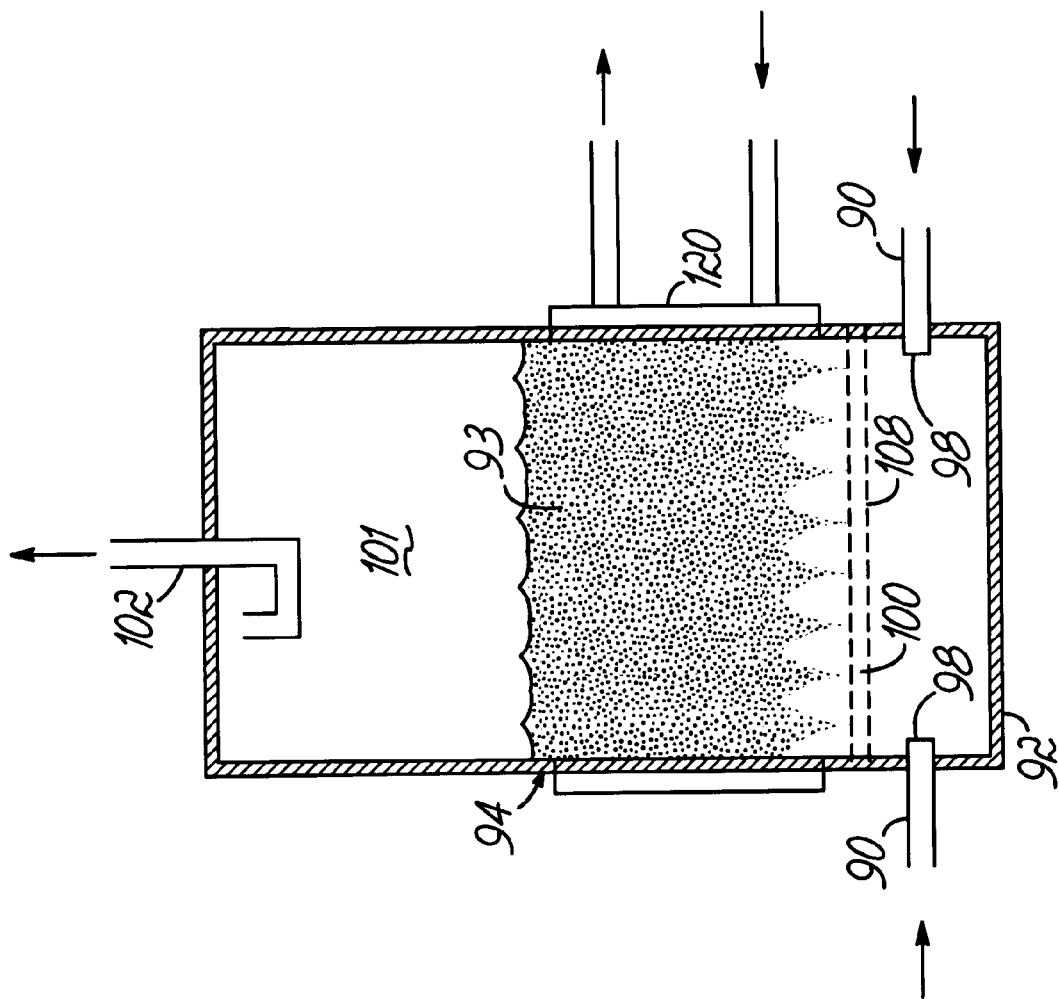
FIG. 2 is a cross-sectional view of the bubbler for use in the present invention.

The present invention is a separation apparatus or system 10 adapted to produce ultra-high purity ammonia. The system includes first and second liquid filters/separators 12 and 14 which are connected to a vaporizer 18. To the extent possible the parts are made of materials which do not interfere with this process and are generally stainless steel, Teflon or Teflon lined.

More particularly, ammonia tank 34, which can be a tanker truck of ammonia or a portable tank of ammonia for smaller volume requirements, provides liquid ammonia to apparatus 10. The ammonia is directed to inlet 38 and through line 40 to the first liquid separation prefilter 12. From the first filter 12 the ammonia is directed through line 42 to liquid/liquid coalescer 14.

Preferably the prefilter 12 is a polypropylene filter which removes solids which could disturb the ammonia oil emulsion. This is a 1–10 micron filter (preferably 10) with a 15 psid maximum pressure drop. The liquid/liquid coalescer 14 is designed for 8–10 ppm inlet and 1–2 ppm outlet (free oil). The coalescer can be a horizontal coalescer having two stages. The primary stage will cause small oil droplets to coalesce into larger droplets by passing through a polypropylene filter element. This is designed for use with emulsions having a surface tension of 0.5 to 40 dyne/cm. In the second stage, the larger droplets separate from the continuous ammonia phase in a settling zone. The pressure drop through coalescer 14 should be 0–10 psid preferably 0–15 psid. The oil and other impurities separated in filter 12 and separator 14 are discarded through drains 44 and 46, respectively.

The liquid phase ammonia passes from the coalescer 14 to the vaporizer 18. Vaporizer 18 is simply a tank which has a heat exchanger such as a water jacket 50 located at a bottom portion of the vaporizer. The ammonia enters the vaporizer through liquid ammonia inlet 52 which directs the ammonia subsurface. The vaporizer further has an ammonia vapor outlet 54.

As shown in the drawing, the tank 18 is tilted towards a drain 58 which permits withdrawal of the denser component of the liquid in vaporizer 18. Inlet 52 is a conduit having a bend 53 directed toward drain 58. Incoming ammonia encourages flow toward drain 58. The denser component will be oil or an ammonia oil emulsion along with metal particles. This denser component drains through drain 58 to valve 60 directed to an ammonia blowdown pot 64. Periodically valve 60 may direct liquid through line 70 to pump 72 which forces the ammonia through line 74 back into inlet 38. This can be used to recirculate portions of the liquid in vaporizer 18.

The outlet 54 from vaporizer 18 is directed to first and second vapor phase filters 78 and 82 which include drains 84 and 86, respectively. The filters 78 and 82 are Teflon® coated filters rated for 0.05 micron to 0.2 micron with a maximum pressure drop of 15 psid. Ammonia vapor passes from filter 82 to a valve 81. Valve 81 can direct vapor either to an outlet 83 or to a manifold 88 connected by conduits 90 to the bottom portion 92 of a bubble column 94. Vapor directed to outlet 83 is collected for further use as anhydrous ammonia.

The ammonia vapor when directed to conduits 90 is introduced through the bottom of the bubble column through inlets 98 and passes through a sparge plate 100 where ammonia bubbles are formed and evenly distributed across the column. These bubbles travel up the column 94 through the water 93 and then to head space 101 to a vapor outlet 102.

The bubble column 94 is specifically designed to produce small bubbles. The length of the column is further designed so that the bubbles so produced will reside in the liquid for a sufficient period of time to allow any particles in the bubbles to migrate from within the bubble to the wall of the bubble via Stokes and Brownian motion. Thus, the length of the column then will depend on bubble size and the speed at which the bubbles pass through the liquid in the column. To promote purification, the bubble size should be small and the rate at which the ammonia vapor is introduced should be controlled.

The solid Teflon® sparge plate 100 has as many small holes 108 as possible. As an example with a column having a liquid depth of about 10 feet and a vapor space of four feet, the diameter of the holes 108 should be no greater than about 3/64" so that for the gas flow of about 42 lbs/hr-ft$^2$=lbs/hr.ft, any impurities will separated into the liquid within the column.

Vapor outlet 102 is connected to third and fourth vapor filters 104 and 106. These filters are preferably rated for 0.2 microns with a maximum pressure drop of 15 psi. Filter 106 directs ammonia gas to either a collection unit or to a mixing unit where it can be combined with high purity water and form ammonium hydroxide.

According to this process, ammonia from tank 34 is introduced into inlet 38 at ambient temperature where it passes through filter 12 and liquid/liquid coalescer 14 which reduces the oil content to less than about 1–2 ppm. Entrained metal particles within the liquid oil will also be removed. Collected impurities are drained through drains 44 and 46.

Pressure causes the remaining liquid ammonia to flow through line 52 into vaporizer 18. A heater such as water jacket 50 maintains the temperature of the ammonia high enough to create vaporous ammonia but not so high as to cause boiling of the ammonia. The temperature of the heated water should be no greater than about 55–65° C. Heated water is supplied to water jacket 50 through line 112 and drained through line 114. The vaporizer is operated quiescently, i.e., with minimal agitation of the liquid ammonia. Additionally, the vapor space above the liquid level in the vaporizer is such that very low vapor velocities are formed. Generally the maximum vapor velocity is 0.5 to 1.0 fps. Preferably it is less than 0.1 fps and most preferably less than 0.02 fps which provides added assurance that no liquid is entrained in the vapor. This prevents liquid ammonia and any entrained impurities from escaping the vaporizer.

Because tank 18 is tilted, denser impurities will collect at drain 58. The collected impurities are directed to ammonia blowdown pot 64.

The vapor that forms in head space 118 of evaporator 18 flows through vapor filters 78 and 82. The pressure in head space 118 is preferably about 100–125 psig. First vapor filter 78 is designed to remove particles having a size of about 0.1 micron. Second vapor filter 82 in turn is designed to remove impurities of a particle size of about 0.05 microns. If desired, the vapor can be directed by valve 81 to outlet 83 and collected.

Alternatively, the vapor can be directed by valve 81 to manifold 88 which divides the gas stream into lines 90 leading into the bottom portion 92 of bubble column 94. The pressure of the gas as it enters column 94 is preferably about 50–60 psig.

The bubble column is filled with saturated high purity ammonium hydroxide. The ammonia gas passes through the holes in sparge plate 100 forming bubbles which rise through the ammonium hydroxide solution.

A heat exchanger such as water jacket 120 maintains the ammonium hydroxide in the column at a temperature of about 20 to about 30° C. The bubbles rise through the ammonium hydroxide and the ammonia vapor passes from the bubble column through port 102. The bubbles migrate at a rate to prevent entrainment of liquid ammonium hydroxide and impurities. The ammonia vapor flows from column 94 through a third and fourth vapor filter 104 & 106, which remove particles of a size of 0.2 microns.

The ammonia vapor is now ready to mix with high purity water to form ammonium hydroxide. Alternately it can be collected for use as a gas or anhydrous liquid. This ammonium hydroxide is suitable for use in production of integrated circuits. Generally, it will have no more than about 100 ppt metal particles, and preferably much less.

Thus by utilization of the present invention, extremely pure ammonia gas is formed without the problems encountered with the prior art separation apparatus. In particular, by removing the majority of the impurities in the liquid phase prior to evaporation, entrainment of impurities is minimized. Further, by using a quiescent evaporator, as opposed to a turbulent evaporator, entrainment of impurities in the vapor phase is again minimized. This permits further purification using vapor filters. Finally, the bubble column is designed to minimize entrainment of impurities and at the same time provide adequate separation time to allow any entrained impurities to be gathered and retained by the liquid phase in the bubble column.

This has been a description of the present invention along with the preferred method of practicing the present invention.

However, the invention itself should only be defined by the appended claims wherein I claim:

1. A method of purifying liquid ammonia comprising:
   passing said liquid ammonia through an oil separator;
   directing said liquid ammonia from said separator and quiescently vaporizing said ammonia to form ammonia vapor;
   directing said ammonia vapor through a bubble column, said bubble column including a saturated solution of ammonium hydroxide; and
   collecting said ammonia vapor after passing through said ammonium hydroxide.

2. The method claimed in claim 1 wherein said liquid ammonia is passed through a first liquid filter before passing through said oil separator and wherein said oil separator is a coalescer.

3. The method claimed in claim 2 wherein said ammonia is vaporized in a vaporizer, wherein said vaporizer is tilted towards a drain and whereby higher density impurities are drained from said vaporizer.

4. The method claimed in claim 2 wherein said bubble column has a height and bubbles are formed having a size small enough to provide any particles entrained in said bubbles sufficient time while passing through said bubble column to contact side walls of said bubbles to thereby be captured by said liquid ammonium hydroxide.

5. The method claimed in claim 3 wherein liquid ammonia is introduced below a liquid surface of said vaporizer.

6. The method claimed in claim 5 wherein said vapor obtained from said quiescent vaporizer is passed through a vapor filter system.

7. The method claimed in claim 6 wherein said vaporous filter system includes a first and a second vapor filter.

8. The method claimed in claim 5 further comprising passing said vapor from said bubble column through a vapor filter system.

9. A method of purifying ammonia comprising
passing liquid ammonia through a liquid phase separator system to remove oil from said liquid ammonia;
passing said liquid ammonia to a vaporizer; and
separating vaporous ammonia from said liquid ammonia in said vaporizer.

10. The method claimed in claim 9 wherein said vaporizer vaporizes said liquid ammonia quiescently.

11. The method claimed in claim 10 further comprising passing bubbles of ammonia gas through a bubble column and collecting ammonia gas passing through said bubble column wherein the bubble column has a length effective to permit solid impurities in said bubbles to pass to a liquid phase in said bubble column.

12. A method of purifying liquid ammonia comprising:
passing said liquid ammonia through an oil separator;
directing said liquid ammonia from said separator and quiescently vaporizing said ammonia to form ammonia vapor;
directing said ammonia vapor through a vapor filter; and
collecting said ammonia vapor.

13. The method claimed in claim 12 wherein said liquid ammonia is passed through a first liquid filter before passing through said oil separator and wherein said oil separator is a coalescer.

14. The method claimed in claim 12 wherein said ammonia is vaporized in a vaporizer, wherein said vaporizer is tilted towards a drain and whereby higher density impurities are drained from said vaporizer.

15. The method claimed in claim 12 wherein said ammonia is vaporized at a rate less than 1 fps.

16. The method claimed in claim 15 wherein said ammonia is vaporized at a rate less than 0.1 fps.

17. The method claimed in claim 16 wherein said ammonia is vaporized at a rate less than 0.02 fps.

18. The method claimed in claim 15 further comprising passing said ammonia vapor through a bubble column wherein said bubble column has a height and bubbles are formed having a size small enough to provide any particles entrained in said bubbles sufficient time while passing through said bubble column to contact side walls of said bubbles to thereby be captured by said liquid ammonium hydroxide.

19. The method claimed in claim 14 wherein liquid ammonia is introduced below a liquid surface of said vaporizer and in a direction toward said drain.

20. The method claimed in claim 18 further comprising passing said vapor from said bubble column through a vapor filter system.

21. A method of purifying ammonia comprising
passing liquid ammonia through a liquid phase separator system to remove oil from said liquid ammonia;
vaporizing said liquid ammonia to form ammonia vapor; and
passing bubbles of said ammonia vapor through a bubble column and collecting ammonia vapor passing through said bubble column wherein the bubble column has a length effective to permit solid impurities in said bubbles to pass to a liquid phase in said bubble column.

* * * * *